United States Patent [19]
Hildebrand

[11] 3,915,516
[45] Oct. 28, 1975

[54] PIVOT MOUNT FOR FLUID ACTUATED POWER CYLINDER

[75] Inventor: Roland F. Hildebrand, Galion, Ohio
[73] Assignee: Harsco Corporation, Camp Hill, Pa.
[22] Filed: Mar. 27, 1974
[21] Appl. No.: 455,389

[52] U.S. Cl. .................................. 308/15; 92/118
[51] Int. Cl.² ........................................ F16C 13/00
[58] Field of Search ............................ 308/15–34; 29/149.5 C; 92/118

[56] References Cited
UNITED STATES PATENTS
2,854,958  10/1958  Wood et al. ..................... 92/118 X
3,421,342  1/1969  Rossiter ........................... 308/26 X Primary Examiner—M. Henson Wood, Jr.
Assistant Examiner—Gene A. Church
Attorney, Agent, or Firm—Palmer Fultz, Esq.

[57] ABSTRACT

A fluid actuated power cylinder of the type that includes pivot mounts on the rod and base end of the cylinder. In accordance with the present invention the pivot mount for the base end of the cylinder is uniquely shaped by a novel method to permit an efficient high strength welded attachment to the cylinder.

1 Claim, 4 Drawing Figures

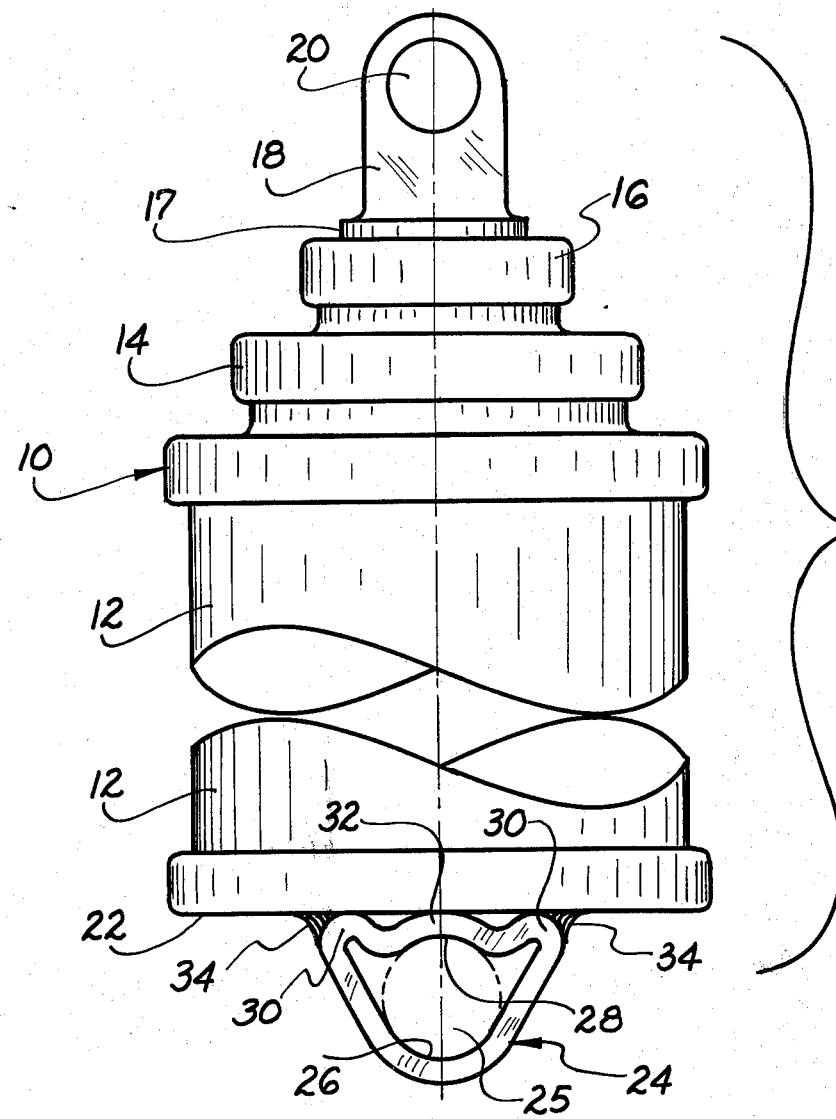
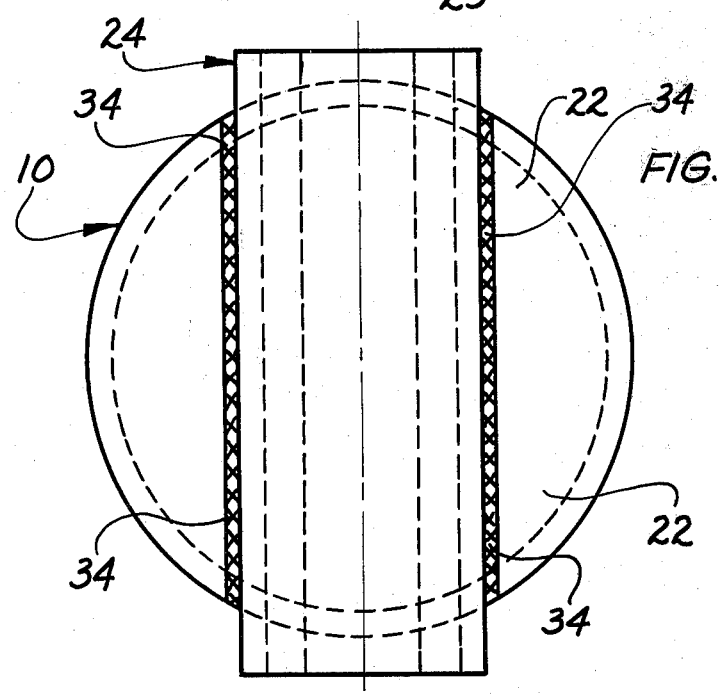

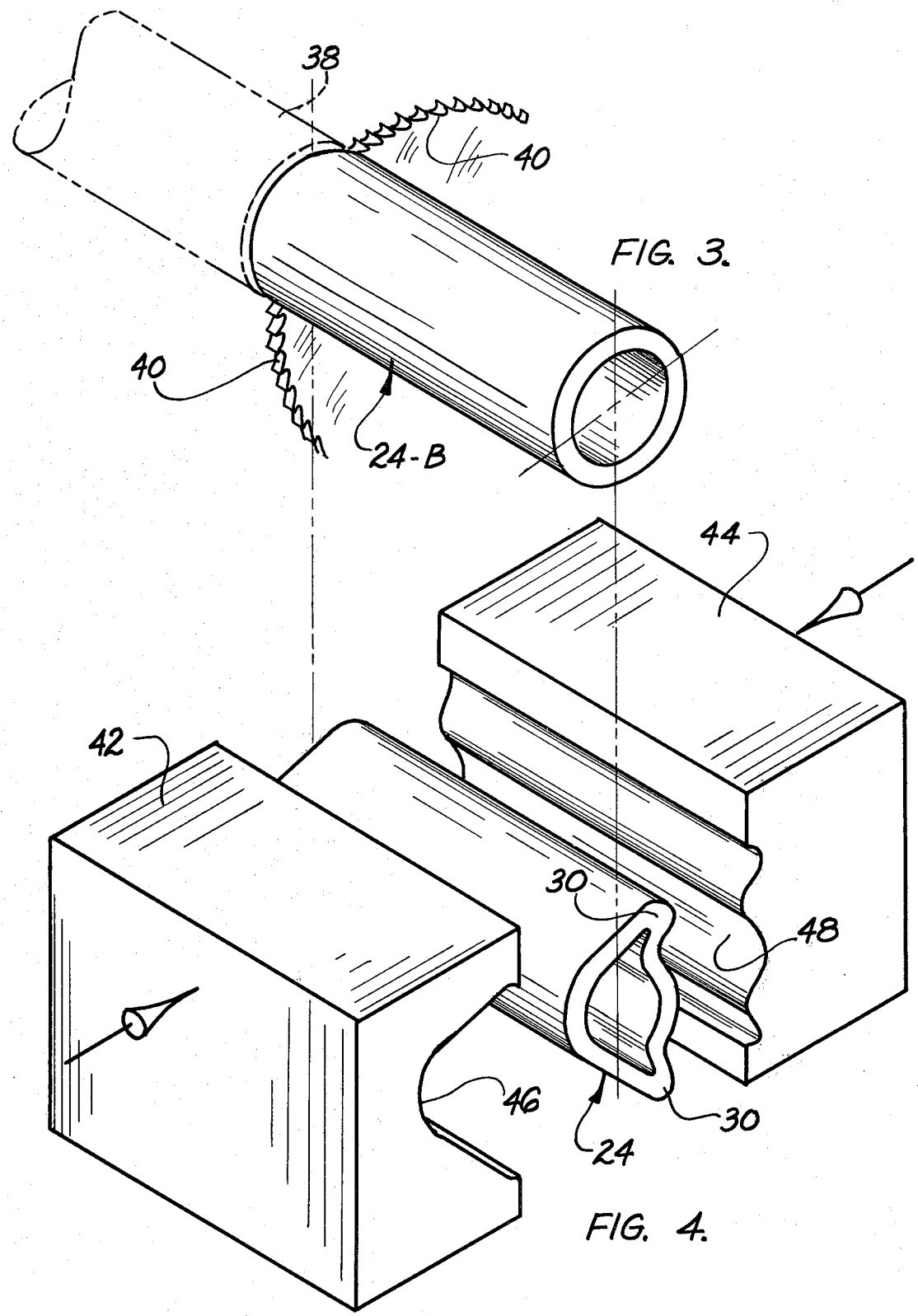

PIVOT MOUNT FOR FLUID ACTUATED POWER CYLINDER

BACKGROUND OF THE INVENTION

The present invention relates to fluid actuated power cylinders and more particularly to a novel construction and method for fabricating pivot mounts for such cylinders.

PROBLEMS IN THE ART

In general, a problem has been present in the operational use of large power cylinders subjected to high operating stresses, such as the relatively large telescoping power cylinders used to raise and lower dump truck bodies, crane booms, and the like.

In the manufacture of such power cylinders it has been common practice to form the pivot mounts for the base ends of the cylinders from lengths of steel tubing which have been welded to the cylinder bases on both sides of the single point of tangency between the round pivot mounts and the flat cylinder bases. The welded junction has proven in practice to be not only difficult to weld properly, but also inherently weak with numerous resulting failures at the welded junction under operational stresses encountered in the field.

In accordance with the present invention, the above described problem has been eliminated by constructing a pivot mount in a novel manner so as to provide a stable attaching base to which strong welded junctions can easily be applied when the pivot mount is attached to the cylinder base.

In general the above is accomplished by forming the mount from a work piece of standard steel tubing, of greater diameter than the pivot pin with which the mount is to be used. The steel tubing work piece is first subjected to pressure in a forming die so as to deform its diameter to provide inner bearing surfaces of proper diameter to pivotally support the pivot pin, and at the same time to form spaced outwardly extending attaching shoulders for spread stable engagement with the cylinder base. The pivot mount is next welded to the cylinder base along both of said attaching shoulders.

SUMMARY OF THE INVENTION

It is therefore a primary object of the present invention to provide a novel pivot mount for fluid actuated power cylinders which mount is adapted for high strength stable attachment to the base of the cylinder by welding.

It is another object of the present invention to provide a novel method of fabricating the pivot joint from standard tubular steel stock of oversize inside diameter with respect to the finished inside diameter of the bearing portions of the finished pivot mount.

It is still another aspect of the present invention to provide a pivot mount of the type described which is uniquely shaped so as to be mountable to a cylinder base with a pivot mount configuration that is inherently highly resistant to high degrees of fatigue and impact stresses during operational use without the need for auxiliary reinforcing or supporting means.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 1 is a side elevational view of a typical power cylinder provided with a pivot mount constructed in accordance with the present invention;

FIG. 2 is an end elevational view of the cylinder and pivot mount of FIG. 1;

FIG. 3 is a perspective view showing a step in the method of fabricating pivot mounts in accordance with the present invention; and FIG. 4 is a second perspective view showing another step in the method of fabricating pivot mounts in accordance with the present invention.

DESCRIPTION OF THE PREFERRED EMBODIMENT

Referring in detail to the drawings, a typical power cylinder constructed in accordance with the present invention is illustrated in FIGS. 1 and 2. The cylinder is by way of example of the telescoping type including a body portion 10 that forms the outermost cylinder 12. An intermediate cylinder 14 is mounted for telescoping movement in the inner wall of outer cylinder 12, and an inner cylinder 16 is in turn mounted for telescoping movement in the inner wall of intermediate cylinder 14.

With continued reference to FIG. 1, a cylinder rod 17 is extended through the end of inner cylinder 16 and mounts a piston, not illustrated, that reciprocates within the cylinder 12. When the base end of the power cylinder is pressurized the sections 14, 16 and rod 17 are extended, and when the rod end is pressurized the components are retracted in the case of a double acting cylinder, or components are retracted by gravity in the case of a single acting cylinder. Cylinder rod 17 further includes a flanged outer end 18 provided with a bearing hole 20 for receiving a pivot pin, not illustrated, the latter being adapted for attachment to the machine to be operated.

Referring again to FIGS. 1 and 2, the power cylinder comprises a novel pivot mount indicated generally at 24 which is mounted to cylinder base 22 at the welds 34. As is best seen in FIG. 1, pivot mount 24 comprises arcuate bearing surfaces 26 and 28 which are shaped as segments of a cylinder of the proper diameter to pivotally receive a pivot pin 25, the latter being adapted for attachment to the frame of the machine to be actuated.

Pivot mount 24 further includes outwardly extending attaching shoulders 30 which provide a broad base configuration which can be easily reached by the torch of a welding machine. As a result efficient welding beads 34 of high strength can be applied, and due to the broad base provided by the spread attaching portions 30 the finished assembly is characterized by high resistance to bending stresses at the welded junctions.

With continued reference to FIG. 1 pivot mount 24 is further characterized by a central bracing portion 32 which transmits compression stresses directly from pivot pin 25 to cylinder base 22 thereby enhancing the strength of the pivot mount as well as preventing distortion of the cylindrical curvature of bearing surfaces 26 and 28.

Reference is next made to FIGS. 3 and 4 which illustrate a novel method for fabricating pviot mounts in accordance with the present invention wherein such mounts are each integrally formed at high rates of production from work pieces 24-B that are sequentially cut off from tubular steel stock 38 by a suitable cut-off machine the blade 40 of which is illustrated in FIG. 3.

After the tubular work piece 24B, FIG. 3, has been cut from the stock it is subjected to deforming pressure in a suitable pressing machine, not illustrated, which machine includes male and female die portions 44 and 42, FIG. 4, having exterior configuration of finished pivot mount 24. A mandrel of the proper outside diameter, inserted into work piece 24-B during the deforming operation assures the formation of the desired curvature for inner bearing surfaces 26 and 28.

After the forming operation of FIG. 4 the inner bearing surfaces 26 and 28 may, if necessary, be machined to accurate tolerance and polished by subjecting such surfaces to reaming and burnishing operations.

Finally, pivot mount 24 is attached to cylinder base 22 by the strips of weld 34, the efficient formation of which is facilitated by the accessible junctions between attaching shoulders 30 and cylinder base 22. The wide spread location of the strips of weld 34, as determined by the broad base configuration of pivot mount 24, provides for a very high degree of stability for pivot mount 24 without the use of auxiliary reinforcing or supporting means.

It may be noted that, after the deforming operation, the peripheral length of the center line of the material in a cross section of pivot mount 24 remains basically the same as the circumferential length of the center line of the material in a cross section of tubular work piece 24-B.

While the form of embodiment of the present invention as herein disclosed constitutes a preferred form, it is to be understood that other forms might be adopted.

What is claimed is:

1. A pivot mount for attachment to the base end of a fluid actuated cylinder comprising a generally cylindrical member having oppositely facing inner surface portions forming inner and outer arcuate bearing surfaces, and integral generally U-shaped attaching shoulders, each of said U-shaped shoulders including an inner leg portion extending from said inner bearing surface to said cylinder base end and an outer leg portion extending from said outer bearing surface to said cylinder base end, said leg portions forming a weldable attaching means for said mount; and a mounting pin pivotally supported by said bearing surfaces.

* * * * *